United States Patent
Hayashi

[11] Patent Number: 6,099,676
[45] Date of Patent: *Aug. 8, 2000

[54] METHOD FOR MAKING AN ARTICLE INCLUDING A TAPE MEMBER BONDED TO AN EXTRUDED RUBBER MEMBER

[75] Inventor: Keizo Hayashi, Nagoya, Japan

[73] Assignee: Toyoda Gosei Co., LTD, Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/915,681

[22] Filed: Aug. 21, 1997

[30] Foreign Application Priority Data

Aug. 30, 1996 [JP] Japan .................................. 8-249247

[51] Int. Cl.[7] .............................. B29C 47/00; B32B 31/20
[52] U.S. Cl. ................................ 156/244.23; 156/244.27; 156/307.7; 156/309.9; 156/312
[58] Field of Search ......................... 156/244.23, 244.27, 156/307.7, 309.9, 312

[56] References Cited

U.S. PATENT DOCUMENTS

| | | |
|---|---|---|
| 4,597,818 | 7/1986 | Aoyama et al. ..................... 156/308.2 |
| 5,123,988 | 6/1992 | Iwasa . |
| 5,143,772 | 9/1992 | Iwasa . |
| 5,415,822 | 5/1995 | Cook .................................. 156/244.27 |
| 5,489,461 | 2/1996 | Iwasa et al. . |
| 5,690,768 | 11/1997 | Iwasa et al. ........................ 156/244.23 |

*Primary Examiner*—John J. Gallagher
*Attorney, Agent, or Firm*—Pillsbury Madison & Sutro Intellectual Property Group

[57] ABSTRACT

A method for making an article including an elongated member and a tape member bonded to the elongated member. An elongated member is extruded from at least one rubber in a continuous manner, then continuously vulcanized. A tape member including at least one resin layer with a melting temperature that is lower than a temperature of the elongated member immediately after vulcanization is separately supplied and preheated to about the softening temperature of the resin layer. The preheated tape member is then continuously contacted with and pressed against the vulcanized elongated member to thereby at least temporarily fix the elongated member to the tape member at opposing surfaces. Contact between the elongated member and the tape member is maintained for a sufficient period of time to cause heat remaining in the elongated member from the vulcanizing step to melt at least the opposing surface of the tape member. The tape member is continuously pressed against the elongated member while removing heat from the tape member to thereby fusion bond the tape member and the elongated member together.

14 Claims, 5 Drawing Sheets

METHOD FOR MAKING AN ARTICLE INCLUDING A TAPE MEMBER BONDED TO AN EXTRUDED RUBBER MEMBER

BACKGROUND OF THE INVENTION

1. Field of the Invention

The present invention relates generally to a method of making an elongated article including an extruded member formed from rubber and a tape member bonded to the extruded member. In particular, the present invention is directed to a method of making an elongated article capable of receiving and securing a portion of a glass member, in which the tape member of the article is constructed and arranged to protect the article against wear encountered by sliding of the glass member across the article.

2. Description of Related Art

A conventional glass runner article for an automobile window is illustrated in FIG. 8. The conventional glass runner article includes an elongated member 40 made of rubber having a bottom portion 41. The article further includes a resin tape 42 formed on the bottom portion 41 of the elongated member 40.

It is known to form the elongated member 40 from EPDM (ethylene-propylene-diene copolymer) rubbers by extrusion molding, and thereafter to bond the resin tape 42 (such as polyethylene tape) to the bottom portion 41 of the member 40. The resin tape 42 serves to improve the slidability and durability of the article by protecting the article from wear due to the sliding of the glass window or windshield thereon.

The bonding of the resin tape 42 to the elongated member 40 is accomplished by the method illustrated in FIG. 7. This method involves forming the elongated member 40 continuously with an extruder 50. Prior to vulcanization of the member 40, a reel 51 continuously supplies the resin tape 42, which is pressed against and attached to the bottom portion 41 of the elongated member 40 (which is not yet vulcanized) by a roller 52. The elongated member 40 is then vulcanized by passing the member 40 through a microwave vulcanizer 53 and an electric heat vulcanizer 54 in sequential manner. While passing through the vulcanizers 53 and 54, the resin tape 42 bonded to the bottom portion 41 of the elongated member 40 is heated and melted, which welds the resin tape 42 to the bottom portion 41.

One disadvantage of the above-discussed conventional method is that the resin tape 42 is heated to a temperature above its melting point by heat in the vulcanizers 53 and 54. Consequently, the resin tape 42 excessively melts, stretches to become wavy, breaks, or peels, leading to low bond strength between the resin tape 42 and the member 40. This problem is not peculiar or limited to glass runners for automobiles; rather, this problem is encountered in the production of a variety of extruded articles comprising rubber materials and resin tapes bonded thereto, such as door opening trim weather strips and inner glass weather strips.

In order to address this problem, the present inventor investigated a method of bonding a resin tape to an extruded member of rubber immediately after vulcanization of the member, rather than during passage through the vulcanizers. This method was found to be unsuccessful, since the extruded member of rubber did not have sufficient heat energy to cause the resin tape to weld by simple pressing.

SUMMARY OF THE INVENTION

It is, therefore, an object of the present invention to solve the above-mentioned problems. This and other objects are achieved by providing a method for bonding a tape member to an extruded rubber member by adequately melting a bonding resin layer of the tape member without stretching and breaking.

According to an embodiment of the present invention, the method includes at least the following steps. An extruded elongated rubber member is continuously formed member from at least one rubber, and continuously vulcanized during its conveyance. A tape member which has at least one resin layer whose melting temperature is lower than the temperature of the elongated rubber member is continuously supplied to the elongated rubber member immediately after vulcanization of the elongated rubber member, and the resin layer is preheated to about the softening temperature thereof. The preheated tape member is continuously pressed by means of a roller against the elongated rubber member immediately after vulcanization to at least temporarily fix the tape member to the elongated member. The temporarily fixed elongated member and the tape member is conveyed while maintaining surface contact therebetween for a prescribed period of time so that the surface of the tape member which is in contact with the elongated rubber member is melted by the heat of the elongated rubber member. The tape member is continuously pressed against the elongated rubber member by means of a roller which removes heat from the tape member, thereby causing the tape member and the elongated member to fusion bond together.

The "tape member" will suffice if it has a resin layer that can bond to the extruded rubber member. (The term "resin" embraces thermoplastic elastomers derived from one or more polyolefins.) The tape member may be formed from a single layer of the same resin or a plurality of layers of different resins. Alternatively, the tape member may have one or more surfaces coated with electrostatic flocking or non-woven fabric.

The resin layer of the tape member has a melting point (melting temperature) which is lower than the temperature of the elongated rubber member immediately after vulcanization by 10° C. to 80° C. A temperature difference smaller than 10° C. is not enough to melt sufficiently the surface of the tape member in contact with the rubber member. Conversely, a temperature difference greater than 80° C. can cause the resin layer to melt more than necessary in the thickness direction. The resin layer of the tape member may be made of any material, such that the selection of this material is not limited. A preferred example is an ultra-high molecular weight polyethylene resin having an average molecular weight of 1–5 million, which is superior in wear resistance. Such polyethylene resin has a softening point of 70–80° C. and a melting point of 120–140° C. These thermal properties are desirable for the temperature difference required in view of the fact that the temperature of the extruded article of rubber immediately after vulcanization is usually about 170–180° C. Other suitable materials for making the resin layer of the tape member include polypropylene (PP) and thermoplastic elastomers (TPE).

After temporary fixing of the tape member to the extruded rubber member, the assembly is conveyed for a "prescribed period of time" which is not specifically restricted but differs depending on the temperature difference and the preheating temperature of the resin layer. The duration of conveyance is preferably 5–10 seconds if the temperature difference is 10° C. to 80° C. A time shorter than 5 seconds is not enough for the contact surface of the resin layer to melt sufficiently. A time longer than 10 seconds will permit the resin layer to melt more than necessary in the thickness direction.

These and other objects, features, and advantages of the present invention will become apparent from the following detailed description of the illustrative embodiments when taken in conjunction with the accompanying drawings which illustrate, by way of example, the principles of the present invention. Various advantages not specifically referred to herein but within the scope of the instant invention will be apparent to those skilled in the art upon practice of the presently disclosed embodiments. The following examples and embodiments are illustrative and not intended to limit the scope of the invention.

BRIEF DESCRIPTION OF THE DRAWING

The accompanying drawings illustrate the present invention. In such drawings.

DESCRIPTION OF THE PREFERRED EMBODIMENTS

The following embodiment of the process of the present invention is described in connection with the production of an article comprising an elongated rubber-member formed from a rubber by extrusion molding and a single layered tape of ultra-high molecular weight polyethylene resin bonded thereto. The article is especially suitable for securing an automotive window or windshield, and the production of the article is explained below in detail with reference to FIGS. 1 to 6.

Figure 6:
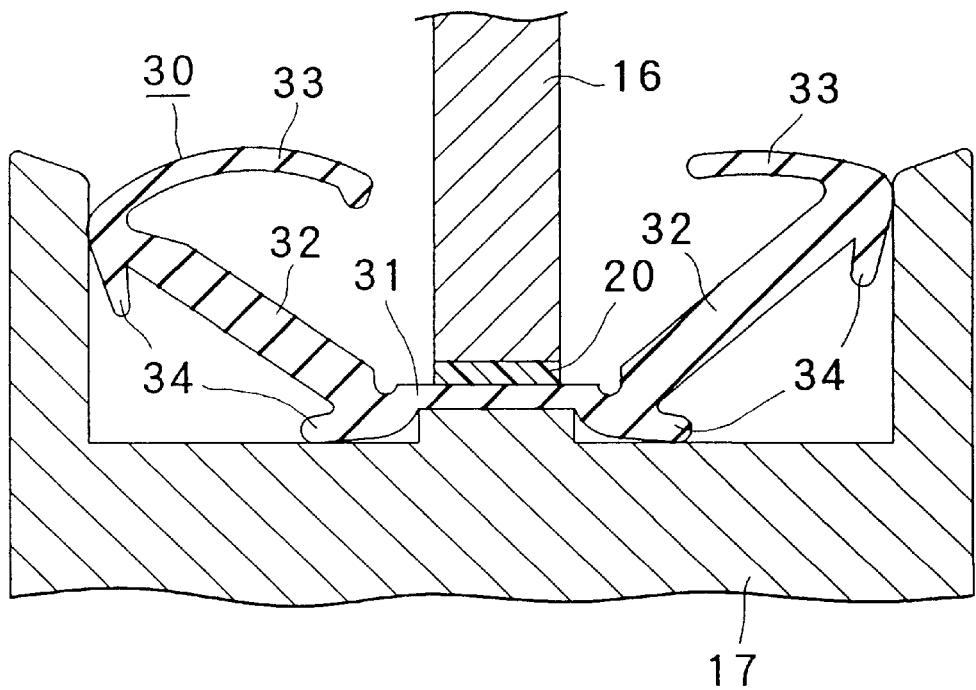
FIG. 6 is a sectional view taken along sectional line VI—VI in FIG. 2 showing a step of pressing with a pressing roller.
Figure 7:
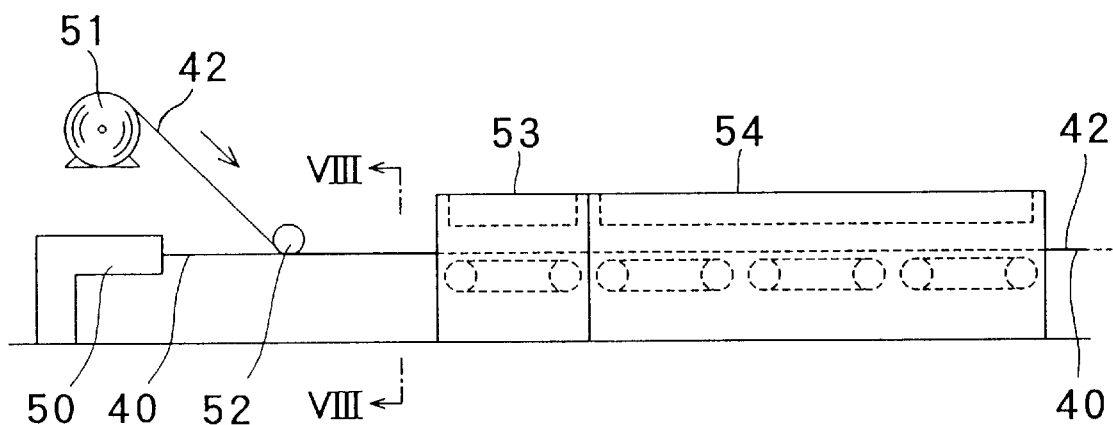
FIG. 7 is a schematic front view of an apparatus for the conventional technology.
Figure 8:
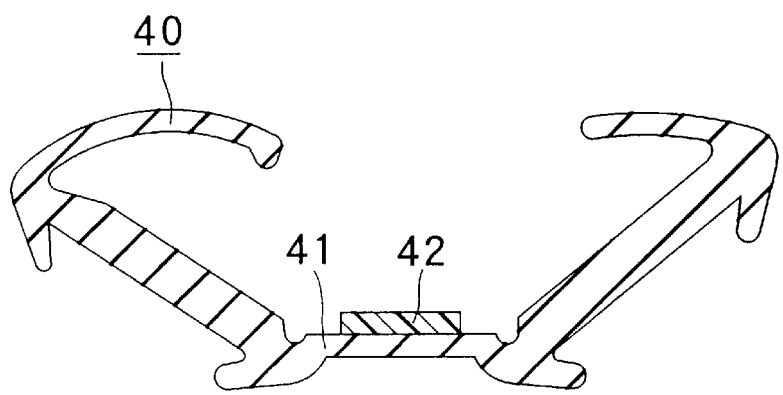
FIG. 8 is a sectional view taken along sectional line VIII—VIII in FIG. 7 showing the elongated member immediately after extrusion.

As shown in FIG. 6, an elongated member 30 comprises a bottom portion 31, side walls 32 extending upward from opposite sides of the bottom portion 31, seal lips 33 (to permit a glass member (not shown) to slide thereon) projecting inward from and slanted relative to the upper ends (unnumbered) of the side walls 32, and four seal lips 34 (to be held by the sash (not shown)) projecting outward from the upper and lower edges (unnumbered) of the side walls 32. These parts 31, 32, 33, and 34 of the elongated member 30 can be made from at least one EPDM solid rubber by continuous extrusion molding and subsequent vulcanization.

Figure 1:
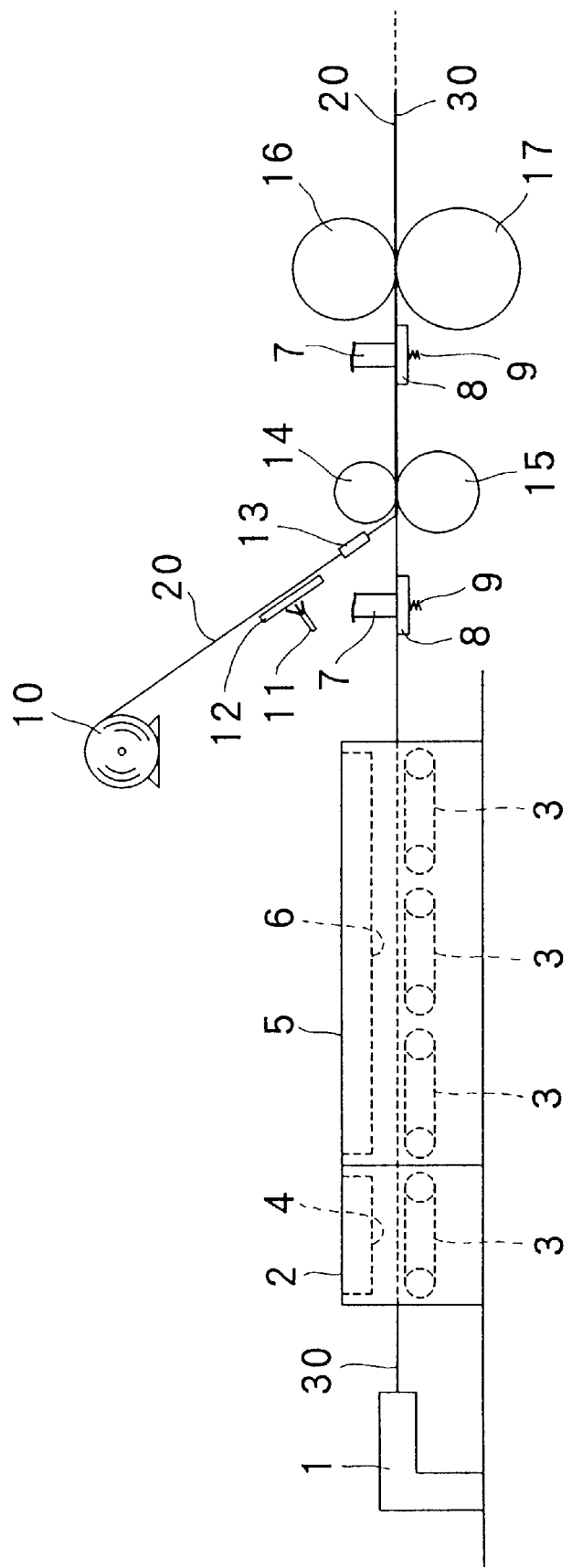
FIG. 1 is a schematic front view representing an apparatus suitable for practicing the process of the present invention.

As shown in FIG. 1, the elongated member 30 (not yet vulcanized) is extruded from an extruder 1 at a rate of about 6 m/min. The elongated member 30 is transferred by one of a series of belt conveyers 3 to a microwave vulcanizer 2, in which the elongated member 30 is rapidly heated by microwaves emitted from a microwave heating unit 4. The elongated member 30 is transferred further by another of the belt conveyors 3 to an electric heat vulcanizer 5, in which the elongated member 30 is heated at a vulcanization temperature by radiation heat emitted from an electric heating unit 6 and vulcanized. Immediately after vulcanization and discharge from the electric heat vulcanizer, the temperature of the member 30 is 170–180° C.

Figure 2:
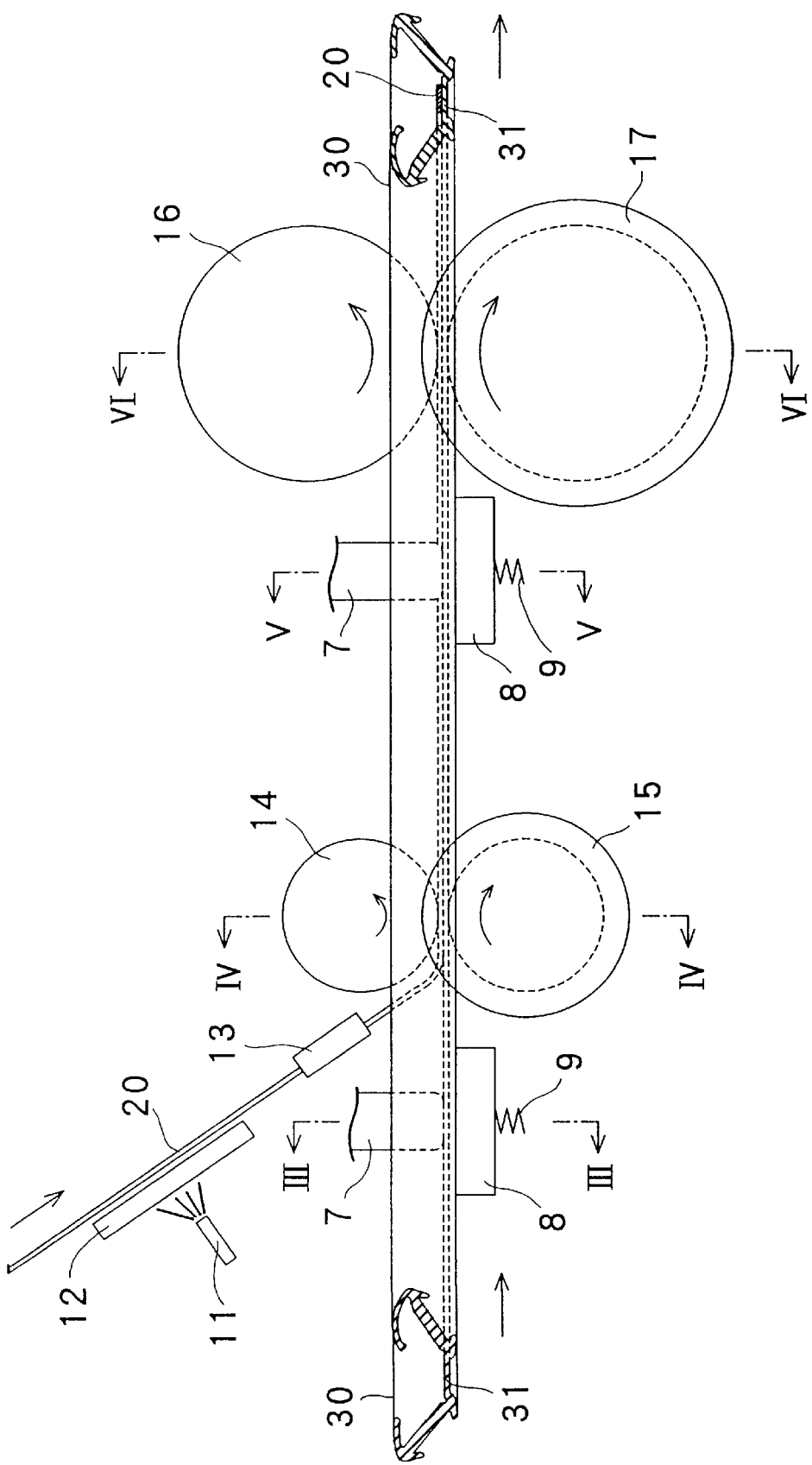
FIG. 2 is an enlarged front view of a portion of the apparatus depicted in FIG. 1.
Figure 3:
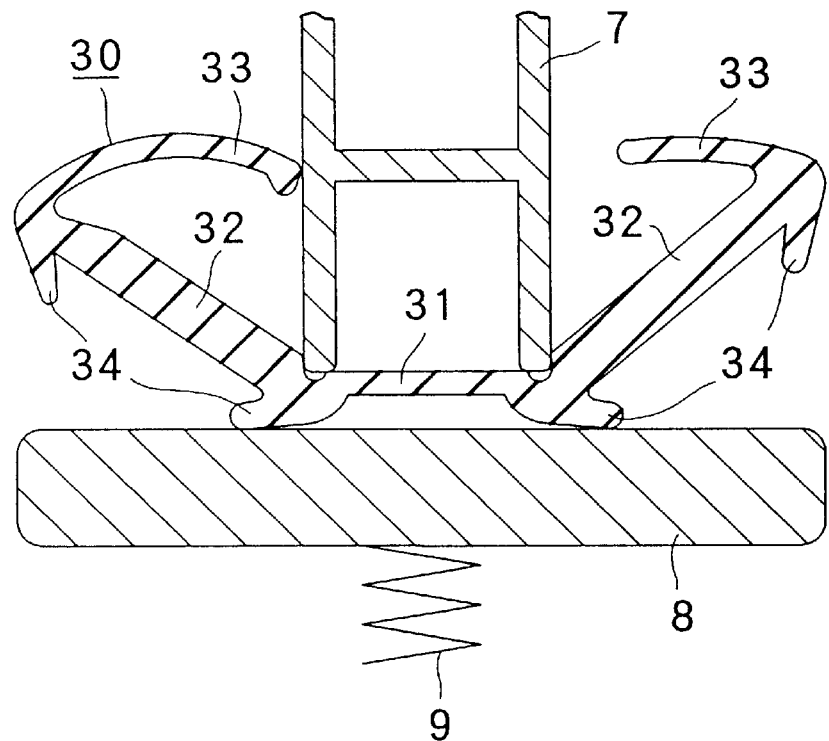
FIG. 3 is a sectional view taken along sectional line III—III of FIG. 2 showing the elongated member immediately after vulcanization.

Then, the member 30 passes between an upper work guide 7 and a lower receiving plate 8 (with the bottom portion 31 down so as to be in closer proximity with the lower receiving plate 8), as shown in FIGS. 2 and 3. The receiving plate 8 is supported by a buffer spring 9 which permits vertical movement of the receiving plate 8. The member 30 is transferred by a take-up unit (not shown), with the seal lips 34 of the member 30 sliding on the receiving plate 8. The work guide 7 has a pair of regulating plates (unnumbered). The member 30 is transferred, with inner corners of the bottom portion 31 sliding on or closely contacting the lower ends of the regulating plates. Thus the work guide 7 and the receiving plate 8 prevent displacement of the member 30 in the lateral direction when the member 30 is passing between the work guide 7 and the receiving plate 8.

To the elongated member 30 is bonded a resin tape 20 for wear prevention. The tape 20 can be made of a highly wear resistant, ultra-high molecular weight polyethylene resin having a softening point of 70–80° C., a melting point of about 130° C., and an average molecular weight of 1–5 million. This resin tape 20 is supplied continuously from reel 10 as shown in FIG. 1.

After being unrolled from the reel 10, the resin tape 20 passes over a heating plate 12 which is heated by a flame or any other heating unit 11. As the result, the heated side of the resin tape 20, which is to be bonded to the elongated member 30, is preheated to about 70° C. (close to its softening point) by radiation heat emitted from the heating plate 12.

After passing over the heating plate 12, the resin tape 20 is introduced into a metal tape guide 13 having a channel cross section. This tape guide 13 prevents displacement of the resin tape 20 in the lateral direction. After passing through the tape guide 13, the resin tape 20 comes into contact with the bottom portion 31 of the elongated member 30, which was passed between the work guide 7 and the receiving plate 8 for appropriate positioning, as was mentioned above.

Figure 4:
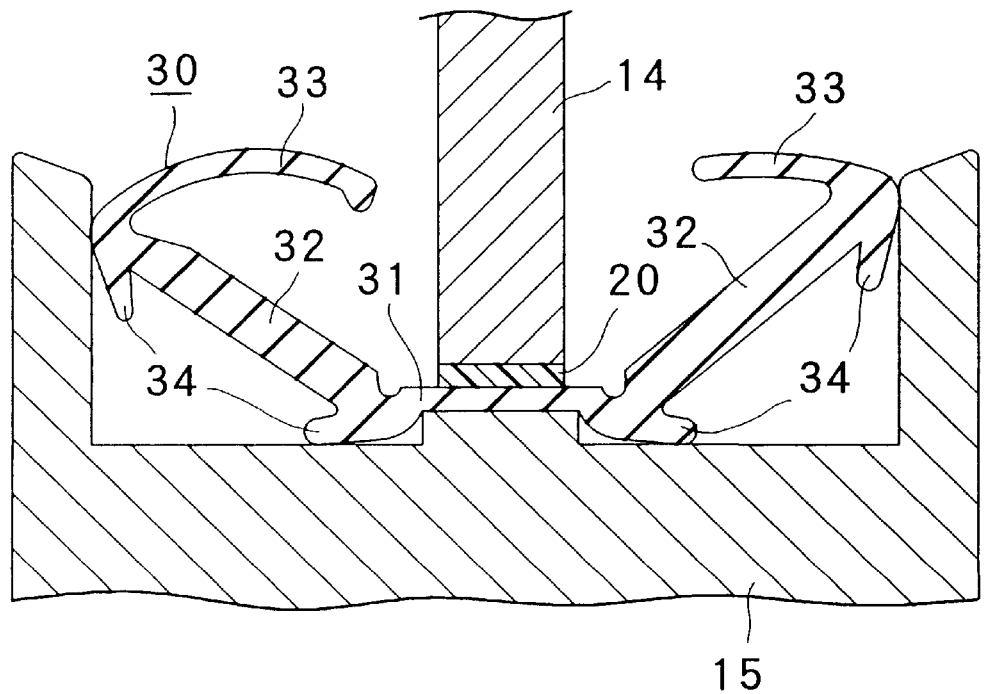
FIG. 4 is a sectional view taken along sectional line IV—IV of FIG. 2 showing a step of temporarily fixing with a temporary fixing roller.

The elongated member 30 and the resin tape 20 pass together between an upper temporarily fixing roller 14 and a lower receiving roller 15, as shown in FIGS. 2 and 4. The receiving roller 15 is constructed so as to hold the entire member 30. The temporarily fixing roller 14 is nearly as wide as the resin tape 20. The roller 14 is pressed downward at all times by an energizing mechanism (not shown), so that the temporarily fixing roller 14 and the receiving roller 15 collectively hold the resin tape 20 and the bottom portion 31 of the elongated member 30 therebetween and rotate as the member 30 advances, thereby fixing the resin tape 20 (which has been softened by preheating) to the bottom portion 31 of the member 30 temporarily and continuously.

The elongated member 30 and the temporarily fixed resin tape 20 are transferred to a pressing roller 16 and a receiving roller 17, which are positioned about 1 meter downstream from rollers 14 and 15, with the upper surface of the bottom portion 31 and the lower surface of the resin tape 20 contacting each other. During this transfer, which takes about 10 seconds, the lower surface of the resin tape 20 is adequately melted by the heat of the elongated member 30, which is higher than the melting point of the resin tape by 40° C. to 50° C. In this embodiment, only a limited portion of the resin tape 20 is melted. That is, the resin tape 20 is melted from the lower surface thereof across a portion of the thickness of the tape 20. (In other words, the upper surface of the resin tape remains unmelted.)

Figure 5:
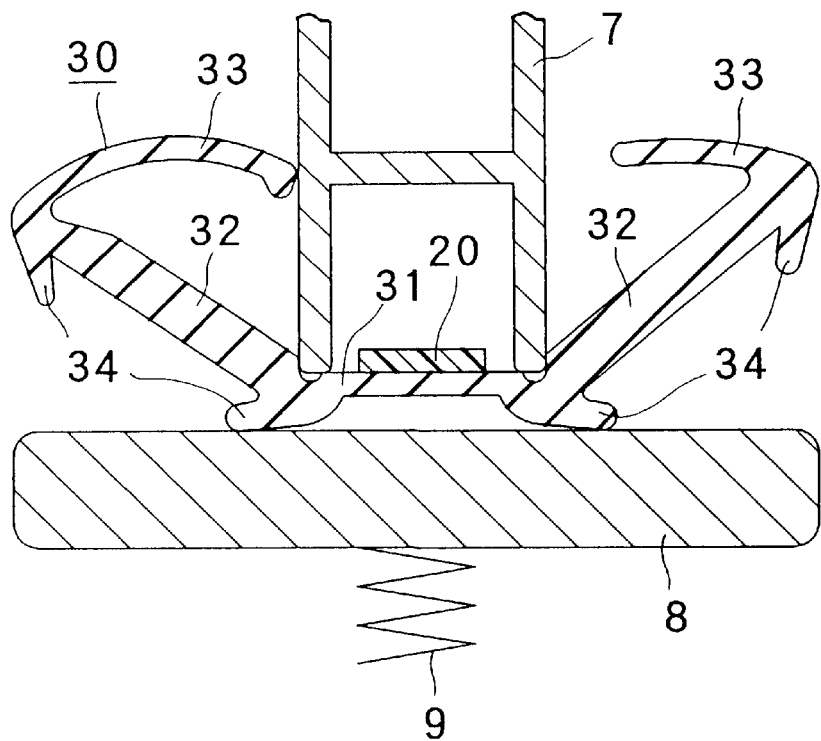
FIG. 5 is a sectional view taken along sectional line V—V in FIG. 2 showing a step of preventing displacement with a sectional work guide.

As shown in FIGS. 2 and 5, the work guide 7 and the receiving plate 8 serve to prevent displacement of the elongated member 30.

The member 30, with its position adjusted by the work guide 7 and the receiving plate 8, passes between the upper pressing roller 16 and the lower receiving roller 17, as shown in FIGS. 2 and 6. The receiving roller 17 is constructed so as to hold the entire member 30. The pressing roller 16 is nearly as wide as the resin tape 20. The pressing roller 16 is pressed downward at all times by an energizing mechanism (not shown), so that the pressing roller 16 and the receiving roller 17 hold the resin tape 20 and the bottom portion 31 of the member 30 therebetween and rotate as the member 30 advances, thereby pressing the adequately melted resin tape 20 to the bottom portion 31 continuously and firmly fusion bonding the resin tape 20. Simultaneously with the fusion bonding, the pressing roller 16 and receiving roller 17, which can be made from metal, remove heat from the elongated member 30 and the resin tape 20 so as to cure the resin tape 20 and bond the member 30 to the resin tape 20.

Unlike the conventional technology, the above-described embodiment is free from the disadvantage of excessively melting the resin tape. The embodiment also offers the advantage that the lower surface of the resin tape 20 in contact with the elongated member 30 is adequately melted at a temperature which is higher than the melting point by 40° C. to 50° C. Therefore, the method of the embodiment permits the resin tape 20 to be bonded firmly without stretching or breaking.

The present invention is not restricted to the above-mentioned embodiment, but various improvements and modifications may be made as follows without departing from the spirit and scope of the invention. By way of example and without limitation, such improvements and modifications include:

(1) extruding two pieces of elongated members (joined side by side) and bonding a resin tape to the bottom of each member simultaneously;

(2) bonding a plurality of resin tape members to a single elongated member, or bonding a plurality of resin tape members to two or more joined elongated members;

(3) bonding an ultra-high molecular weight polyethylene resin tape not only to the bottom portion of an elongated member, but also to the surface of each seal lip of the elongated member, optionally in a simultaneous manner;

(4) preheating the resin layer of the tape member by hot air or any other heater or by using the tape guide 13 as a preheating means;

(5) replacing the vulcanizers 2 and 5 with any other vulcanizer (for example, the electric vulcanizer 5 can be replaced by a hot air vulcanizer); and (6) applying the method of the present invention for the purpose of bonding a tape member to an extruded article of rubber other than a glass runner article for purposes other than wear prevention (for example, the present invention can be practiced to bond a tape member to a trim of door weather strip or to bond a decorative resin tape member or fabric tape member to another member).

A method for bonding a tape member to an extruded rubber member is disclosed in priority document Japanese Patent Application No. 8-249247, which was filed in Japan on Aug. 30, 1996, the complete disclosure of which is incorporated herein by reference.

Many different modifications, variations, and improvements to this invention may be made without departing from the spirit and scope thereof. It is to be understood that such modifications, variations, and improvements to the present invention are intended to be included within the scope of the appended claims.

What is claimed is:

1. A method for bonding an elongated member and a tape member together, said method comprising:

extruding an elongated member from at least one rubber precursor;

vulcanizing the elongated member and developing a heated temperature thereof;

moving a separate tape member toward the elongated member, said separate tape member being comprised of at least one resin layer with a melting temperature lower than the heated temperature of the elongated member immediately after said vulcanizing step, and preheating the resin layer to a softening temperature of the resin;

pressing the tape member and the elongated member together with at least one first roller after said vulcanizing and preheating steps to thereby at least temporarily fix the elongated member and the tape member together at mating surfaces;

thereafter conveying the fixed elongated member and the tape member for a period of time sufficient to cause heat remaining in the elongated member to melt at least an opposing surface of the tape member but insufficient to permit the heat remaining in the elongated member from said vulcanizing step to melt the entire tape member; and pressing the tape member and the elongated member together with at least one second roller while removing heat from the tape member to thereby fusion bond the tape member and the elongated member together.

2. The method according to claim 1, wherein the tape member is a single layered film made from one resin.

3. The method according to claim 1, wherein the tape member is a multiple layered composite made from a plurality of different resins.

4. The method according to claim 1, wherein the tape member has at least one surface coated with an electrostatic flocking.

5. The method according to claim 1, wherein the tape member has at least one surface coated with non-woven fabric.

6. The method according to claim 1, wherein the at least one resin layer of the tape member is made from a polyethylene resin having an average molecular weight of from 1 million to 5 million.

7. A method for bonding an elongated member and a tape member together, said method comprising:

extruding an elongated member from at least one rubber precursor;

vulcanizing the elongated member and developing a heated temperature thereof;

moving a separate tape member toward the elongated member, said separate tape member being comprised of at least one resin layer with a melting temperature 10° C. to 80° C. lower than the heated temperature of the elongated member immediately after said vulcanizing step, and preheating the resin layer to a softening temperature of the resin;

pressing the tape member and the elongated member together with at least one first roller after said vulcanizing and preheating steps to thereby at least temporarily fix the elongated member and the tape member together at mating surfaces;

thereafter conveying the fixed elongated member and the tape member for a period of time sufficient to cause heat remaining in the elongated member to melt at least an opposing surface of the tape member, but insufficient to permit the heat remaining in the elongated member to melt the entire tape member, said period of time is in the range of from 5 seconds to 10 seconds; and pressing the tape member and the elongated member together with at least one second roller while removing heat from the tape member to thereby fusion bond the tape member and the elongated member together.

8. The method according to claim 7, wherein the tape member is a single layered film made from one resin.

9. The method according to claim 7, wherein the tape member is a multiple layered composite made from a plurality of different resins.

10. The method according to claim 7, wherein the tape member has at least one surface coated with an electrostatic flocking.

11. The method according to claim 7, wherein the tape member has at least one surface coated with non-woven fabric.

12. The method according to claim 7, wherein the at least one resin layer of the tape member is made from a polyethylene resin having an average molecular weight of from 1 million to 5 million.

13. A method for bonding an elongated member and a tape member together, said method comprising:

extruding an elongated member from at least one rubber precursor, wherein said elongated member constitutes glass run having a concave cross-section;

vulcanizing the elongated member and developing a heated temperature thereof;

moving a separate polyethylene tape member, toward the elongated member, said polyethylene tape member being comprised of at least one resin layer with a melting temperature 10° C. to 80° C. lower than the heated temperature of the elongated member immediately after said vulcanizing step, and preheating the resin layer to a softening temperature of the resin;

pressing the polyethylene tape member and the elongated member together with at least one first roller after said vulcanizing and preheating steps to thereby at least temporarily fix the elongated member and the polyethylene tape member together at mating surfaces;

thereafter conveying the fixed elongated member and the polyethylene tape member for a period of time sufficient to cause heat remaining in the elongated member to melt at least an opposing surface of the polyethylene tape member, but insufficient to permit the heat remaining in the elongated member to melt the entire polyethylene tape member, said period of time is in the range of from 5 seconds to 10 seconds; and pressing the polyethylene tape member and the elongated member together with at least one second roller while removing heat from the polyethylene tape member to thereby fusion bond the polyethylene tape member and the elongated member together.

14. The method according to claim 13, wherein the at least one resin layer of the tape member is made from a polyethylene resin having an average molecular weight of from 1 million to 5 million.

* * * * *